United States Patent
Luo et al.

(10) Patent No.: US 10,582,506 B2
(45) Date of Patent: Mar. 3, 2020

(54) ADAPTATION OF SUBCARRIER FREQUENCY SPACING BASED ON ENERGY EFFICIENCY INDICATOR

(71) Applicant: HUAWEI TECHNOLOGIES CO., LTD., Shenzhen, Guangdong (CN)

(72) Inventors: Jian Luo, Munich (DE); Zhao Zhao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 15/695,522

(22) Filed: Sep. 5, 2017

(65) Prior Publication Data
US 2018/0049182 A1 Feb. 15, 2018

Related U.S. Application Data

(63) Continuation of application No. PCT/EP2015/055171, filed on Mar. 12, 2015.

(51) Int. Cl.
*H04W 4/00* (2018.01)
*H04W 72/04* (2009.01)
(Continued)

(52) U.S. Cl.
CPC ..... *H04W 72/048* (2013.01); *H04W 52/0216* (2013.01); *H04L 5/0007* (2013.01)

(58) Field of Classification Search
CPC . H04L 5/0007; H04L 27/2602; H04L 27/264; H04W 52/02; H04W 52/0216;
(Continued)

(56) References Cited

U.S. PATENT DOCUMENTS 7,072,412 B1 * 7/2006 Bellanger ........... H04L 27/2082
375/261
8,432,951 B2 * 4/2013 Lele ........................ H04J 13/10
370/342
(Continued)

FOREIGN PATENT DOCUMENTS

CN 101043496 A 9/2007
CN 103298092 A 9/2013
(Continued)

OTHER PUBLICATIONS

Renfors et al, Filter Banks for Next Generation Multicarrier Wireless Communications, EURASIP Journal on Advances in Signal Processing, 147 pages, 2010.*
(Continued)

*Primary Examiner* — Frank Duong
(74) *Attorney, Agent, or Firm* — Fish & Richardson P.C.

(57) ABSTRACT

The invention relates to a network entity for managing communications of a plurality of communication devices within a communication network, a communication device of the plurality of communication devices being configured to transmit a multi-carrier communication signal comprising a plurality of sub-carriers, and to transmit an energy efficiency indicator indicating an energy efficiency specification of the communication device, the network entity comprising a communication interface being configured to receive the energy efficiency indicator over the communication network, and a processor being configured to determine a sub-carrier frequency spacing of the plurality of sub-carriers upon the basis of the energy efficiency indicator, and to generate a resource block indicator associated with the communication device, wherein the resource block indicator indicates the sub-carrier frequency spacing, wherein the communication interface is further configured to transmit
(Continued)

the resource block indicator over the communication network to the communication device.

8 Claims, 13 Drawing Sheets

(51) Int. Cl.
*H04W 52/02* (2009.01)
*H04L 5/00* (2006.01)

(58) Field of Classification Search
CPC ... H04W 72/04; H04W 72/048; H04W 76/02; H04W 88/08
See application file for complete search history.

(56) References Cited

U.S. PATENT DOCUMENTS

| | | | |
|---|---|---|---|
| 8,811,306 B2* | 8/2014 | Callard | H04B 7/155 370/329 |
| 9,673,949 B2* | 6/2017 | Kim | H04L 27/264 |
| 9,866,410 B2* | 1/2018 | Kim | H04L 25/0224 |
| 2007/0127361 A1 | 6/2007 | Kasami et al. | |
| 2015/0351098 A1* | 12/2015 | Schellmann | H04L 5/0064 370/329 |

FOREIGN PATENT DOCUMENTS

| | | |
|---|---|---|
| EP | 2911321 A1 | 8/2015 |
| WO | 2008/097038 A2 | 8/2008 |
| WO | 2013/017930 A2 | 2/2013 |
| WO | 2014/065563 A1 | 5/2014 |
| WO | 2014/121847 A1 | 8/2014 |

OTHER PUBLICATIONS

Schellmann et al, FBMC-based air interface for 5G Mobile: Challenges and proposed solutions, ICST, 6 pages, 2014.*
Popovski et al, Mobile and wireless communications Enablers for the Twenty-twenty Information Society, METIS_D2.2_v1, 79 pages, 2013.*
Sungmook Lim et al., "Optimal Tone Space Selection Scheme for OFDMA-VTS in Carrier Aggregation", IEEE Transactions on Wireless Communications, vol. 12, No. 11, Nov. 2013, total 14 pages.
Kollar, Zs. et al., "Clipping-Based Iterative PAPR-Reduction Techniques for FBMC", 17th International OFDM Workshop 2012 (InOWo"12), Aug. 29-30, 2012, total 7 pages.
Sungmook Lim et al., "Optimal Tone Space Selection Scheme for OFDMA-VTS in Carrier Aggregation", IEEE Transactions on Wireless Communications, vol. 12, No. 11, Nov. 2013, total 14 pages.
Ihalainen, T. et al., "Filter bank based multi-mode multiple access scheme for wireless uplink", 17th European Signal Processing Converence (EUSIPCO 2009), Glasgow, Scotland, Aug. 24-28, 2009, total 5 pages.
Suvra S. Das et al., "Dynamically Adaptive Bandwidth for Sub Carriers in OFDM based Wireless Systems", IEEE Communications Society subject matter experts for publication in the WCNC 2007 proceedings, total 6 pages.
Yuen, C.H. et al., "Single carrier frequency division multiple access (SC-FDMA) for filter bank multicarrier communication systems", Fifth International Conference on Cognitive Radio Oriented Wireless Networks and Communications 2010 (CROWNCOM 2010), total 5 pages.
Alphan Sabin et al., "Multi-User Aware Frame Structure for OFDMA Based System", Vehicular Technology Conference (VTC Fall), Sep. 3, 2012, total 6 pages.
Office Action issued in Chinese Application No. 201580077746.5 dated May 17, 2019, 14 pages.

* cited by examiner

ADAPTATION OF SUBCARRIER FREQUENCY SPACING BASED ON ENERGY EFFICIENCY INDICATOR

CROSS-REFERENCE TO RELATED APPLICATIONS

This application is a continuation of International Application No. PCT/EP2015/055171, filed on Mar. 12, 2015, the disclosure of which is hereby incorporated by reference in its entirety.

TECHNICAL FIELD

The invention relates to the field of multi-carrier communications, in particular to adaptive transmission and radio resource management for multi-carrier communications.

BACKGROUND

Multi-carrier modulation (MCM) is used in many communication systems due to its advantages regarding flexibility, multi-user support and link adaptation.

Typical multi-carrier modulation schemes include orthogonal frequency division multiplexing (OFDM) modulation and filter-bank multi-carrier (FBMC) modulation. Filter-bank multi-carrier modulation is a promising candidate for next generation mobile communication networks since, in comparison with other multi-carrier modulation schemes, it has advantages such as low out-of-band radiation, and no need for a cyclic prefix (CP).

One of the major challenges for multi-carrier transmission is the energy consumption of communication devices, which affects the battery life time of the communication devices. Among a number of factors, the peak-to-average power ratio (PAPR) of the multi-carrier communication signals has a major impact on the energy consumption, since it is directly related to the power efficiency of power amplifiers (PA) within the communication devices.

In Kollar, Zs., Varga, L., Czimer, K., "Clipping-Based Iterative PAPR-Reduction Techniques for FBMC", 17th International OFDM Workshop 2012 (InOWo'12), 29-30 Aug. 2012, an iterative clipping base approach is described to reduce the peak-to-average power ratio of filter-bank multi-carrier communication signals. However, the iterative clipping based approach causes high processing complexity and processing delay and/or strong nonlinear distortions and spectrum regrowth, i.e. an increased out-of-band emission, of the multi-carrier communication signals.

In Ihalainen, T. et al., "Filter bank based multi-mode multiple access scheme for wireless uplink", EUSIPCO 2009, filter-bank spread and discrete Fourier transform (DFT) spread based approaches are described to reduce the peak-to-average power ratio of filter-bank multi-carrier communication signals. Besides having a high processing complexity, these approaches achieve a minor reduction of the peak-to-average power ratio. Moreover, the approaches result in an increased processing delay and longer tails of the multi-carrier communication signals.

In Yuen, C. H., Amini, P., Farhang-Boroujeny, B., "Single carrier frequency division multiple access (SC-FDMA) for filter bank multicarrier communication systems", Fifth International Conference on Cognitive Radio Oriented Wireless Networks and Communications 2010 (CROWNCOM 2010), a single-carrier filter-bank multi-carrier (SC-FBMC) modulation is described. In this approach, the overall communication signal can be formed by a pure single carrier communication signal having a reduced peak-to-average power ratio using one filter for the entire transmission bandwidth. However, this causes a reduced flexibility of communications within communication networks.

When managing communications of a plurality of communication devices within a communication network, it is desirable to consider the energy efficiency for the plurality of communication devices during communications over the communication network.

SUMMARY

It is an object of the invention to provide an efficient concept for managing communications of a plurality of communication devices within a communication network.

An object is achieved by the features of the independent claims. Further implementation forms are apparent from the dependent claims, the description and the figures.

The invention is based on the finding that a sub-carrier frequency spacing of a multi-carrier communication signal transmitted by a communication device can be adjusted upon the basis of an energy efficiency indicator provided by the communication device. The number of sub-carriers for a given transmission bandwidth and subsequently the sub-carrier frequency spacing, can have a direct impact on the peak-to-average power ratio of the multi-carrier communication signal, which on its part directly relates to the energy efficiency of an amplifier, e.g. a power amplifier, of the communication device.

The adjustment can be performed for a plurality of communication devices based on a frame structure for communications within the communication network. The frame structure can be adapted, thereby exploiting the flexibility of multi-carrier modulation schemes. Consequently, an efficient concept for managing communications within the communication network is provided, which allows for an increased energy efficiency of the plurality of communication devices within the communication network. Energy efficiency specifications of the plurality of communication devices can be met by this kind of radio resource management and adaptive transmission over the communication network.

According to a first aspect, the invention relates to a network entity for managing communications of a plurality of communication devices within a communication network, a communication device of the plurality of communication devices being configured to transmit a multi-carrier communication signal comprising a plurality of sub-carriers, and to transmit an energy efficiency indicator indicating an energy efficiency specification of the communication device, the network entity comprising a communication interface being configured to receive the energy efficiency indicator over the communication network, and a processor being configured to determine a sub-carrier frequency spacing of the plurality of sub-carriers upon the basis of the energy efficiency indicator, and to generate a resource block indicator associated with the communication device, wherein the resource block indicator indicates the sub-carrier frequency spacing, wherein the communication interface is further configured to transmit the resource block indicator over the communication network to the communication device. Thus, an efficient concept for managing communications of the plurality of communication devices within the communication network is realized. The concept can e.g. be energy and/or power efficient.

The network entity can be a base station or a relay station of the communication network or an autonomous transmission terminal. The network entity can be configured to adapt a frame structure for communications of the plurality of communication devices within the communication network, wherein the frame structure can comprise a plurality of resource blocks.

The multi-carrier communication signal can be a filter-bank multi-carrier (FBMC) communication signal. The energy efficiency indicator can be an Energy Efficiency Requirement Indicator (EERI). The resource block indicator can indicate the sub-carrier frequency spacing in units of Hz or its temporal counterpart, a symbol duration, in units of seconds.

In a first implementation form of the network entity according to the first aspect as such, the processor is further configured to determine a number of sub-carriers of the multi-carrier communication signal upon the basis of the energy efficiency indicator, wherein the resource block indicator further indicates the number of sub-carriers of the multi-carrier communication signal. In this way, the peak-to-average power ratio of the multi-carrier communication signal can further be adjusted.

The number of sub-carriers times the sub-carrier frequency spacing equals the bandwidth of the multi-carrier communication signal transmitted by a communication device. The number of sub-carriers can further be determined upon the basis of a receiving power indicator, a data rate indicator, and/or a number of communication devices. The multi-carrier communication signal can be transmitted by the communication device.

In a typical uplink communication, the number of frequency sub-carriers of each communication device, e.g. user equipment (UE), can be determined. Each communication device can transmit a multi-carrier communication signal. The multi-carrier communication signals of all communication devices can aggregate to an overall multi-carrier communication signal which is received by the network entity, e.g. a base station. In this context, an individual multi-carrier communication signal of an individual communication device is considered.

In a second implementation form of the network entity according to the first aspect as such or any preceding implementation form of the first aspect, the processor is further configured to determine a lower transmission frequency of the multi-carrier communication signal, an upper transmission frequency of the multi-carrier communication signal, and/or a transmission time slot of the multi-carrier communication signal, wherein the resource block indicator further indicates the lower transmission frequency, the upper transmission frequency, and/or the transmission time slot of the multi-carrier communication signal. Thus, radio resources for communications within the communication network can be allocated.

The transmission bandwidth of the multi-carrier communication signal can be indicated by a difference between the upper transmission frequency and the lower transmission frequency. The upper transmission frequency and the lower transmission frequency can define a transmission bandwidth of a transmitted multi-carrier communication signal of a communication device.

In a third implementation form of the network entity according to the first aspect as such or any preceding implementation form of the first aspect, the sub-carrier frequency spacing of the plurality of sub-carriers is an integer multiple of a predetermined sub-carrier frequency spacing associated with the communication network. Thus, the sub-carrier frequency spacing can be determined efficiently.

The predetermined sub-carrier frequency spacing can be a minimum sub-carrier frequency spacing derived from a predetermined sub-carrier frequency grid associated with a frame structure of the communication network.

In a fourth implementation form of the network entity according to the first aspect as such or any preceding implementation form of the first aspect, the communication interface is further configured to transmit a reference signal over the communication network to the communication device, and to receive a receiving power indicator over the communication network from the communication device, wherein the receiving power indicator indicates a path loss of the reference signal, and wherein the processor is further configured to determine the sub-carrier frequency spacing upon the basis of the receiving power indicator. Thus, propagation characteristics of the reference signal can be considered for managing communications within the communication network.

The processor can further be configured to determine the number of sub-carriers of the multi-carrier communication signal upon the basis of the receiving power indicator. The receiving power indicator can be a Reference Signal Receiving Power (RSRP) indicator. The reference signal can be a pilot signal. The path loss can be a propagation path loss.

In a fifth implementation form of the network entity according to the first aspect as such or any preceding implementation form of the first aspect, the communication interface is further configured to receive a data rate indicator over the communication network from the communication device, wherein the data rate indicator indicates a data rate specification of the communication device, and wherein the processor is further configured to determine the sub-carrier frequency spacing upon the basis of the data rate indicator. Thus, desired data rates can be considered for managing communications within the communication network.

The processor can further be configured to determine the number of sub-carriers of the multi-carrier communication signal upon the basis of the data rate indicator.

In a sixth implementation form of the network entity according to the first aspect as such or any preceding implementation form of the first aspect, the processor is configured to determine the sub-carrier frequency spacing of the plurality of sub-carriers upon the basis of a number of communication devices within the plurality of communication devices. Thus, the sub-carrier frequency spacing can be determined efficiently. The network entity can adapt the frame structure according to the number of communication devices.

The processor can further be configured to determine the number of sub-carriers of the multi-carrier communication signal upon the basis of the number of communication devices. The processor can be configured to determine the number of communication devices within the plurality of communication devices. The number of communication devices can serve as an input parameter based on which the frame structure and/or the frequency sub-bands having different sub-carrier frequency spacings can be adjusted. The number of communication devices can e.g. be 1, 2, 5, 10, 20, 50 or 100.

According to a second aspect, the invention relates to a communication device for transmitting a multi-carrier communication signal over a communication network, the multi-carrier communication signal comprising a plurality of sub-carriers, the communication device comprising a communication interface being configured to transmit an energy efficiency indicator over the communication network, the energy efficiency indicator indicating an energy efficiency specification of the communication device, and to receive a resource block indicator over the communication network, the resource block indicator indicating a sub-carrier frequency spacing of the plurality of sub-carriers, and a processor being configured to generate the multi-carrier communication signal upon the basis of the sub-carrier frequency spacing, wherein the communication interface is further configured to transmit the multi-carrier communication signal over the communication network. Thus, an efficient concept for managing communications of the plurality of communication devices within the communication network is realized.

The communication device can be a user equipment (UE). The energy efficiency specification can be derived upon the basis of a battery status of the communication device. The energy efficiency specification of the communication device can be predetermined, e.g. by an energy efficiency category of the communication device.

In a first implementation form of the communication device according to the second aspect as such, the resource block indicator further indicates a number of sub-carriers of the multi-carrier communication signal, a lower transmission frequency of the multi-carrier communication signal, an upper transmission frequency of the multi-carrier communication signal, and/or a transmission time slot of the multi-carrier communication signal, wherein the processor is further configured to generate the multi-carrier communication signal upon the basis of the number of sub-carriers, the lower transmission frequency, the upper transmission frequency, and/or the transmission time slot. Thus, the multi-carrier communication signal can be generated efficiently.

In a second implementation form of the communication device according to the second aspect as such or any preceding implementation form of the second aspect, the communication interface is further configured to receive a reference signal over the communication network, wherein the processor is further configured to generate a receiving power indicator upon the basis of the reference signal, wherein the receiving power indicator indicates a path loss of the reference signal, and wherein the communication interface is further configured to transmit the receiving power indicator over the communication network. Thus, propagation characteristics of the reference signal can be considered for managing communications within the communication network.

In a third implementation form of the communication device according to the second aspect as such or any preceding implementation form of the second aspect, the processor is further configured to generate a data rate indicator indicating a data rate specification of the communication device, wherein the communication interface is further configured to transmit the data rate indicator over the communication network. Thus, desired data rates can be considered for managing communications within the communication network.

In a fourth implementation form of the communication device according to the second aspect as such or any preceding implementation form of the second aspect, the communication interface comprises an amplifier being configured to amplify the multi-carrier communication signal, wherein the amplifier has an adjustable amplifying back-off, wherein the processor is further configured to determine a peak-to-average power ratio of the multi-carrier communication signal, and to adjust the amplifying back-off of the amplifier upon the basis of the determined peak-to-average power ratio. Thus, the energy efficiency of the communication device can be adjusted efficiently.

The number of sub-carriers and consequently the sub-carrier frequency spacing can directly relate to the peak-to-average power ratio. The peak-to-average power ratio can directly relate to the energy efficiency of the amplifier and/or of the communication device. The amplifier can be a power amplifier (PA).

According to a third aspect, the invention relates to a communication system comprising a network entity for managing communications of a plurality of communication devices within a communication network, and a communication device for transmitting a multi-carrier communication signal over the communication network. Thus, an efficient concept for managing communications of the plurality of communication devices within the communication network is realized.

The communication system can be a centralized cellular communication system or a device-to-device (D2D) communication system that may either operate stand-alone or under assistance of a cellular infrastructure. The network entity and the communication device can communicate with each other over the communication network.

According to a fourth aspect, the invention relates to a frame structure for communications of a plurality of communication devices within a communication network, a first communication device of the plurality of communication devices being configured to transmit a first multi-carrier communication signal comprising a first plurality of sub-carriers, a second communication device of the plurality of communication devices being configured to transmit a second multi-carrier communication signal comprising a second plurality of sub-carriers, the frame structure comprising a plurality of resource blocks, wherein a first resource block of the plurality of resource blocks comprises the first plurality of sub-carriers having a first sub-carrier frequency spacing, and wherein a second resource block of the plurality of resource blocks comprises the second plurality of sub-carriers having a second sub-carrier frequency spacing. Thus, an efficient concept for managing communications of the plurality of communication devices within the communication network is realized.

The network entity can be configured to adapt the frame structure. The communication device can be configured to transmit the multi-carrier communication signal according to the frame structure.

The first resource block can be arranged within a first lower transmission frequency and a first upper transmission frequency. The second resource block can be arranged within a second lower transmission frequency and a second upper transmission frequency. The first sub-carrier frequency spacing and the second sub-carrier frequency spacing can be different.

In a first implementation form of the frame structure according to the fourth aspect as such, the first resource block of the plurality of resource blocks comprises a first plurality of transmission time slots, and the second resource block of the plurality of resource blocks comprises a second plurality of transmission time slots. Thus, a transmission time slot can be allocated to a communication device.

The plurality of resource blocks can be a plurality of time-frequency resource blocks. The plurality of resource blocks can have different sub-carrier frequency spacings and time durations. Each resource block of the plurality of resource blocks can accommodate multi-carrier communication signals of multiple communication devices for simultaneous transmission, e.g. using different sub-carrier sets.

According to a fifth aspect, the invention relates to a method for managing communications of a plurality of communication devices within a communication network, a communication device of the plurality of communication devices being configured to transmit a multi-carrier communication signal comprising a plurality of sub-carriers, and to transmit an energy efficiency indicator indicating an energy efficiency specification of the communication device, the method comprising receiving the energy efficiency indicator over the communication network, determining a sub-carrier frequency spacing of the plurality of sub-carriers upon the basis of the energy efficiency indicator, generating a resource block indicator associated with the communication device, wherein the resource block indicator indicates the sub-carrier frequency spacing, and transmitting the resource block indicator over the communication network to the communication device. Thus, an efficient concept for managing communications of the plurality of communication devices within the communication network is realized.

The method can be performed by the network entity. Further features of the method directly result from the functionality of the network entity.

According to a sixth aspect, the invention relates to a method for transmitting a multi-carrier communication signal over a communication network, the multi-carrier communication signal comprising a plurality of sub-carriers, the method comprising transmitting an energy efficiency indicator over the communication network, the energy efficiency indicator indicating an energy efficiency specification of the communication device, receiving a resource block indicator over the communication network, the resource block indicator indicating a sub-carrier frequency spacing of the plurality of sub-carriers, generating the multi-carrier communication signal upon the basis of the sub-carrier frequency spacing, and transmitting the multi-carrier communication signal over the communication network. Thus, an efficient concept for managing communications of the plurality of communication devices within the communication network is realized.

The method can be performed by the communication device. Further features of the method directly result from the functionality of the communication device.

According to a seventh aspect, the invention relates to a computer program comprising a program code for performing the methods when executed on a computer. Thus, the methods can be performed in an automatic and repeatable manner. The network entity and/or the communication device can be programmably arranged to perform the computer program.

The invention can be implemented in hardware and/or software.

BRIEF DESCRIPTION OF THE DRAWINGS

Embodiments of the invention will be described with respect to the following figures, in which.

DETAILED DESCRIPTION OF EMBODIMENTS

Figure 1:
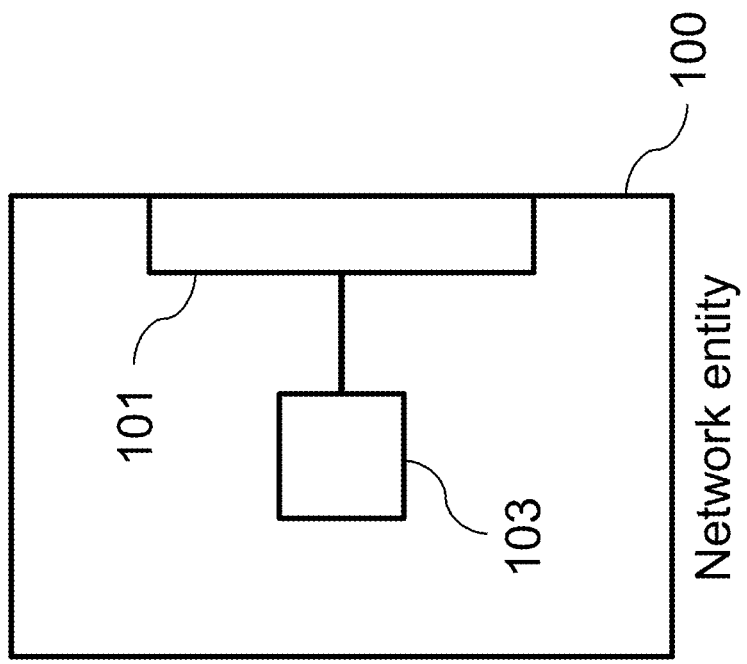
FIG. 1 shows a diagram of a network entity for managing communications of a plurality of communication devices within a communication network according to an embodiment.

FIG. 1 shows a diagram of a network entity 100 for managing communications of a plurality of communication devices within a communication network according to an embodiment.

A communication device of the plurality of communication devices is configured to transmit a multi-carrier communication signal comprising a plurality of sub-carriers, and to transmit an energy efficiency indicator indicating an energy efficiency specification of the communication device.

The network entity 100 comprises a communication interface 101 being configured to receive the energy efficiency indicator over the communication network, and a processor 103 being configured to determine a sub-carrier frequency spacing of the plurality of sub-carriers upon the basis of the energy efficiency indicator, and to generate a resource block indicator associated with the communication device, wherein the resource block indicator indicates the sub-carrier frequency spacing, wherein the communication interface 101 is further configured to transmit the resource block indicator over the communication network to the communication device.

Figure 2:
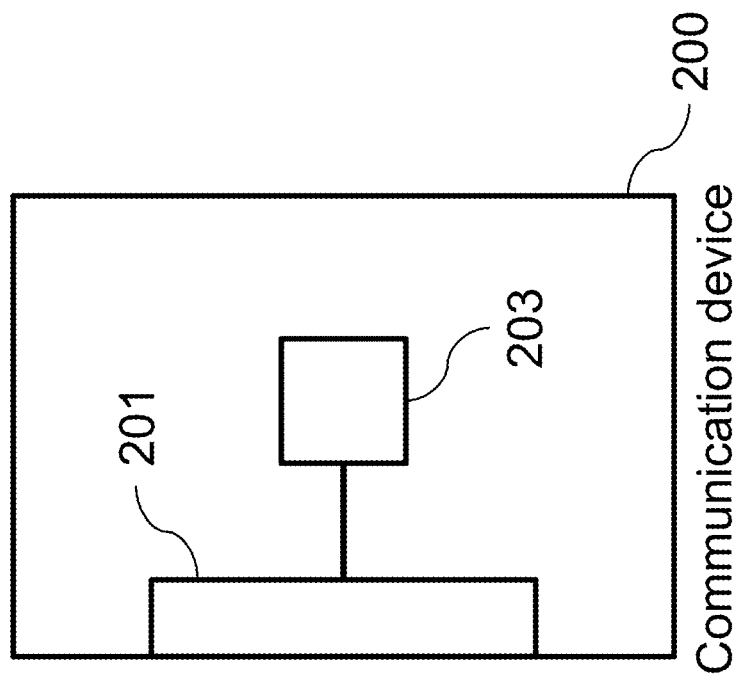
FIG. 2 shows a diagram of a communication device for transmitting a multi-carrier communication signal over a communication network according to an embodiment.

FIG. 2 shows a diagram of a communication device 200 for transmitting a multi-carrier communication signal over a communication network according to an embodiment. The multi-carrier communication signal comprises a plurality of sub-carriers.

The communication device 200 comprises a communication interface 201 being configured to transmit an energy efficiency indicator over the communication network, the energy efficiency indicator indicating an energy efficiency specification of the communication device 200, and to receive a resource block indicator over the communication network, the resource block indicator indicating a sub-carrier frequency spacing of the plurality of sub-carriers, and a processor 203 being configured to generate the multi-carrier communication signal upon the basis of the subcarrier frequency spacing, wherein the communication interface 201 is further configured to transmit the multi-carrier communication signal over the communication network.

Figure 3:
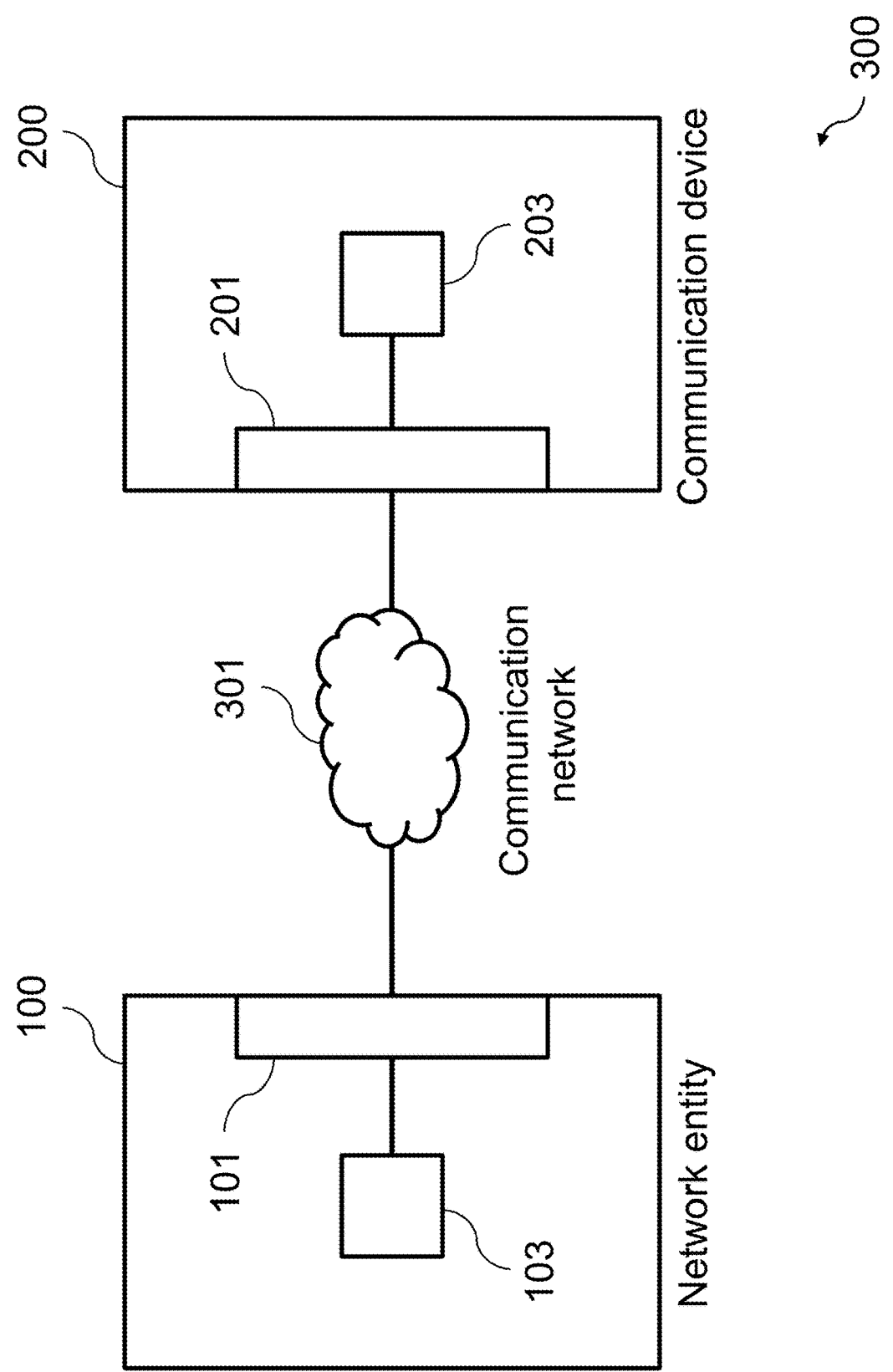
FIG. 3 shows a diagram of a communication system comprising a network entity and a communication device according to an embodiment.

FIG. 3 shows a diagram of a communication system 300 comprising a network entity 100 and a communication device 200 according to an embodiment. The network entity 100 and the communication device 200 communicate with each other over a communication network 301.

The network entity 100 is configured to manage communications of a plurality of communication devices within the communication network 301. The communication device 200 is configured to transmit a multi-carrier communication signal comprising a plurality of sub-carriers over the communication network 301, and to transmit an energy efficiency indicator indicating an energy efficiency specification of the communication device 200 over the communication network 301.

The network entity 100 comprises a communication interface 101 being configured to receive the energy efficiency indicator over the communication network 301, and a processor 103 being configured to determine a sub-carrier frequency spacing of the plurality of sub-carriers upon the basis of the energy efficiency indicator, and to generate a resource block indicator associated with the communication device 200, wherein the resource block indicator indicates the sub-carrier frequency spacing. The communication interface 101 is further configured to transmit the resource block indicator over the communication network 301 to the communication device 200.

The communication device 200 comprises a communication interface 201 being configured to transmit the energy efficiency indicator over the communication network 301, and to receive the resource block indicator over the communication network 301, and a processor 203 being configured to generate the multi-carrier communication signal upon the basis of the sub-carrier frequency spacing. The communication interface 201 is further configured to transmit the multi-carrier communication signal over the communication network 301.

Figure 4:
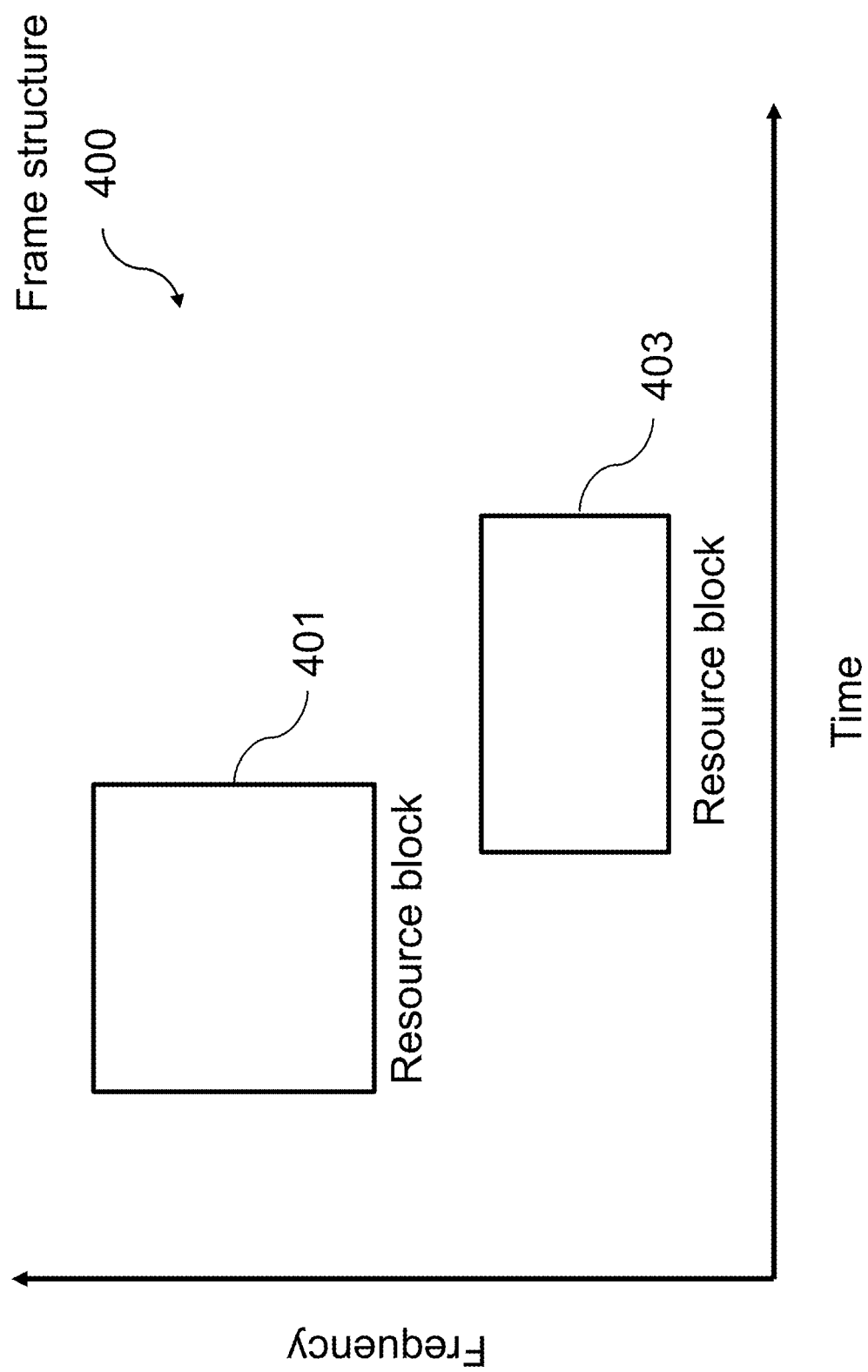
FIG. 4 shows a diagram of a frame structure for communications of a plurality of communication devices within a communication network according to an embodiment.

FIG. 4 shows a diagram of a frame structure 400 for communications of a plurality of communication devices within a communication network according to an embodiment.

A first communication device of the plurality of communication devices is configured to transmit a first multi-carrier communication signal comprising a first plurality of sub-carriers. A second communication device of the plurality of communication devices is configured to transmit a second multi-carrier communication signal comprising a second plurality of sub-carriers.

The frame structure 400 comprises a plurality of resource blocks 401, 403, wherein a first resource block 401 of the plurality of resource blocks 401, 403 comprises the first plurality of sub-carriers having a first sub-carrier frequency spacing, and wherein a second resource block 403 of the plurality of resource blocks 401, 403 comprises the second plurality of sub-carriers having a second sub-carrier frequency spacing.

The first resource block 401 can be arranged within a first lower transmission frequency and a first upper transmission frequency. The second resource block 403 can be arranged within a second lower transmission frequency and a second upper transmission frequency. The first sub-carrier frequency spacing and the second sub-carrier frequency spacing can be different.

The first resource block 401 of the plurality of resource blocks 401, 403 can comprise a first plurality of transmission time slots, and the second resource block 403 of the plurality of resource blocks 401, 403 can comprise a second plurality of transmission time slots.

Figure 5:
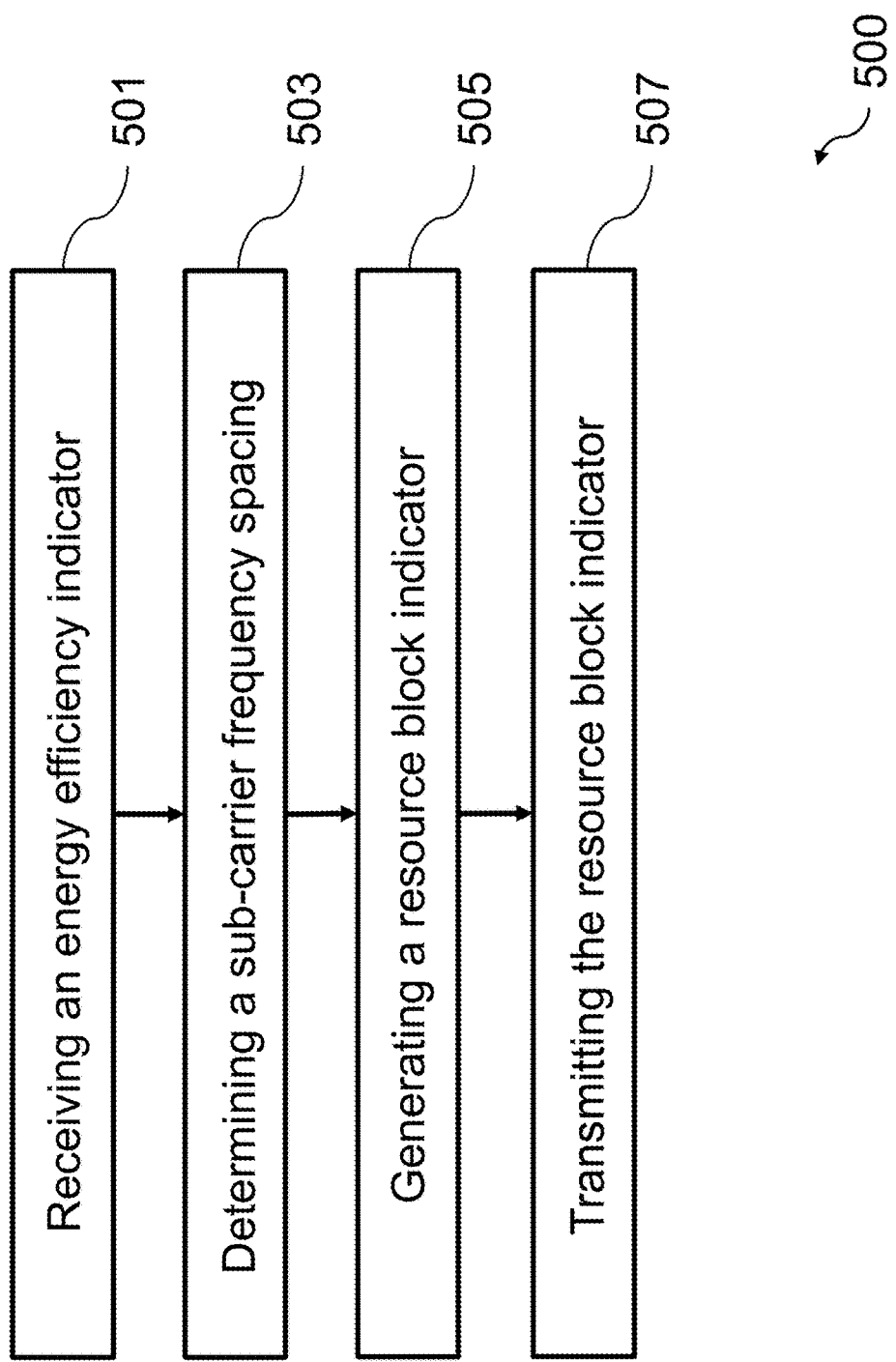
FIG. 5 shows a diagram of a method for managing communications of a plurality of communication devices within a communication network according to an embodiment.

FIG. 5 shows a diagram of a method 500 for managing communications of a plurality of communication devices within a communication network according to an embodiment.

A communication device of the plurality of communication devices is configured to transmit a multi-carrier communication signal comprising a plurality of sub-carriers, and to transmit an energy efficiency indicator indicating an energy efficiency specification of the communication device.

The method 500 comprises receiving 501 the energy efficiency indicator over the communication network, determining 503 a sub-carrier frequency spacing of the plurality of sub-carriers upon the basis of the energy efficiency indicator, generating 505 a resource block indicator associated with the communication device, wherein the resource block indicator indicates the sub-carrier frequency spacing, and transmitting 507 the resource block indicator over the communication network to the communication device.

Figure 6:
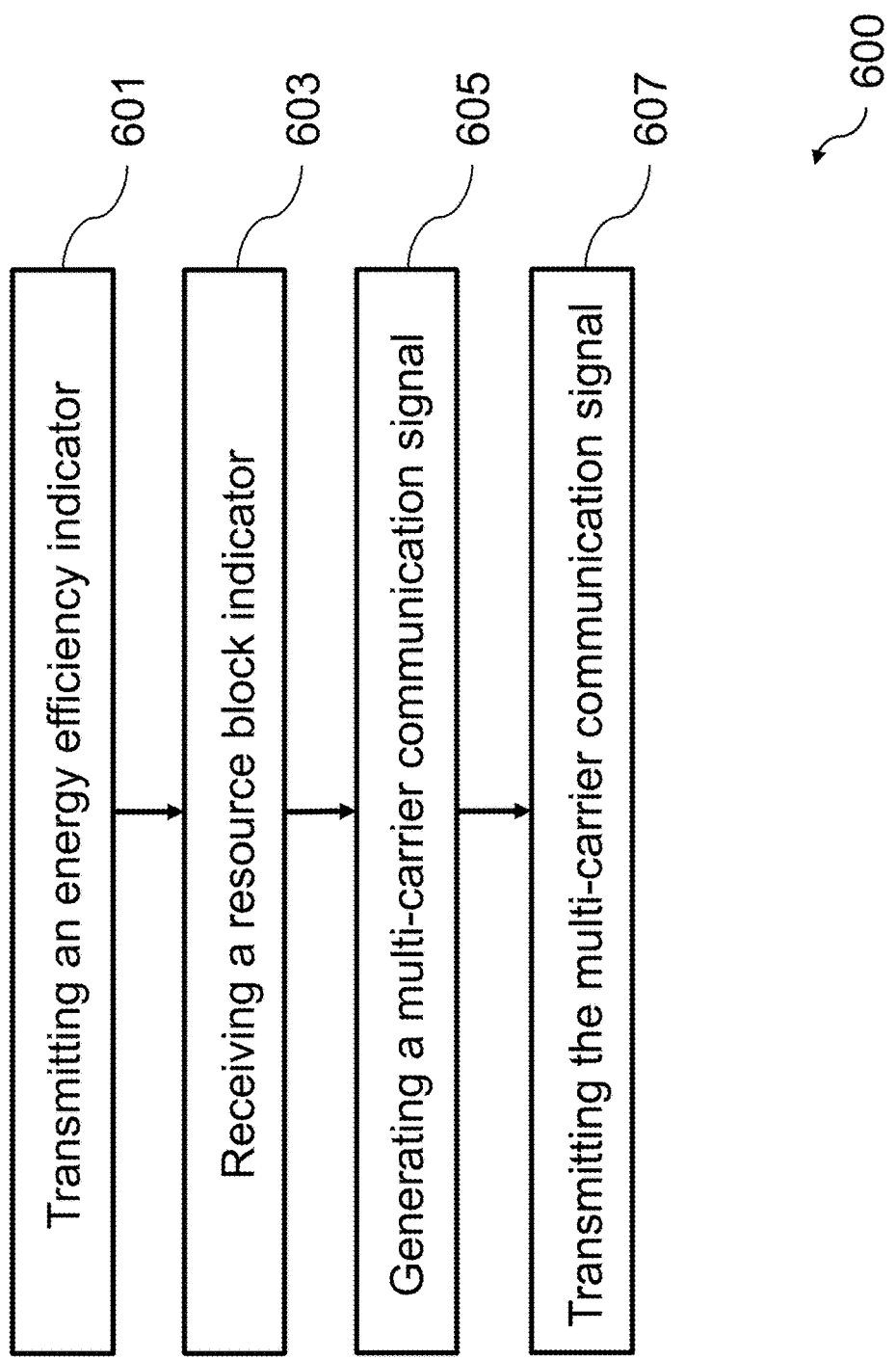
FIG. 6 shows a diagram of a method for transmitting a multi-carrier communication signal over a communication network according to an embodiment.

FIG. 6 shows a diagram of a method 600 for transmitting a multi-carrier communication signal over a communication network according to an embodiment. The multi-carrier communication signal comprises a plurality of sub-carriers.

The method 600 comprises transmitting 601 an energy efficiency indicator over the communication network, the energy efficiency indicator indicating an energy efficiency specification of the communication device, receiving 603 a resource block indicator over the communication network, the resource block indicator indicating a sub-carrier frequency spacing of the plurality of sub-carriers, generating 605 the multi-carrier communication signal upon the basis of the sub-carrier frequency spacing, and transmitting 607 the multi-carrier communication signal over the communication network.

In the following, further implementation forms and embodiments of the network entity 100, the communication device 200, the communication system 300, the frame structure 400, the method 500, and the method 600 are described.

The approach allows for an energy efficiency adapted transmission in communication networks, e.g. wireless communication networks, using multi-carrier communication signals, e.g. filter-bank multi-carrier communication signals.

Multi-carrier modulation is used in many communication networks due to its advantages regarding flexibility, multi-user support and link adaptation. Among different multi-carrier modulation schemes, filter-bank multi-carrier is a promising candidate for next generation mobile communications, e.g. fifth generation (5G) mobile communications, since, in comparison with conventional multi-carrier modulation schemes, it has many advantages such as low out-of-band radiation, no need for cyclic prefix (CP). Moreover, it can allow for a flexible adaption of a frame structure for communications within the communication network.

Figure 7:
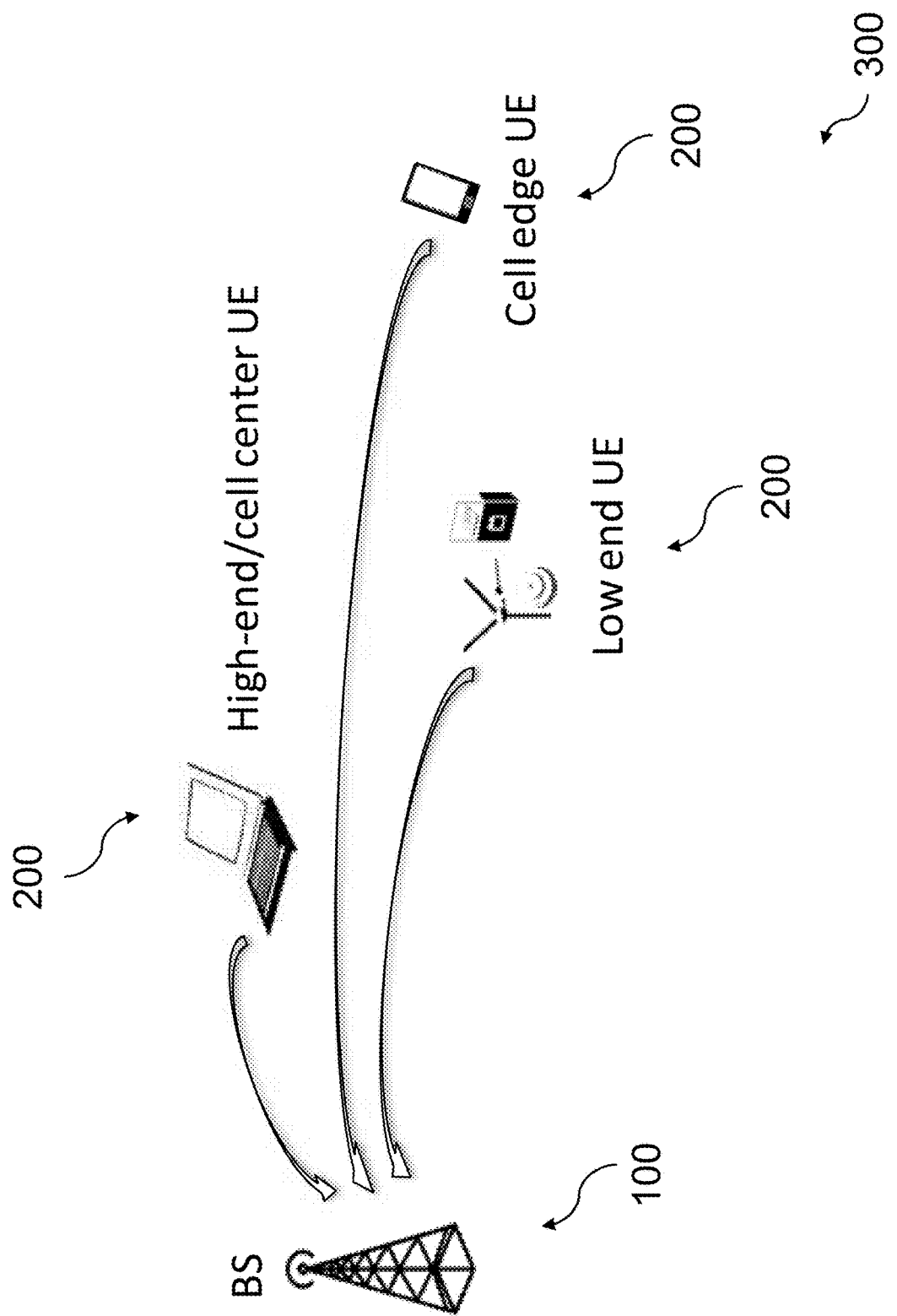
FIG. 7 shows a diagram of a communication system comprising a network entity and a communication device according to an embodiment.

FIG. 7 shows a diagram of a communication system 300 comprising a network entity 100 and a communication device 200 according to an embodiment. The network entity 100 can be a base station (BS) of the communication network. The communication device 200 can be a user equipment (UE). The communication device 200 can be a high end/cell center communication device 200, a low end communication device 200, or a cell edge communication device 200. The diagram illustrates uplink transmission of different types of communication devices 200 having different energy efficiency specifications.

In a first exemplary application, it is considered that multi-carrier modulation schemes, such as filter-bank multi-carrier modulation, are used for uplink transmission. One of the major challenges for uplink transmission can be the energy consumption of the communication devices, which can affect the battery life of the communication devices. Therefore, energy efficiency may be taken into account in the design of schemes for uplink transmission.

Among a number of factors, the peak-to-average power ratio (PAPR) of the transmit multi-carrier communication signals can have a major impact on the energy efficiency, since it can directly be related to the power efficiency of amplifiers, e.g. power amplifiers (PA), within the communication devices 200, which can consume a large percentage of the total power. Generally, the lower the peak-to-average power ratio is, the higher the energy and/or power efficiency may be. In other words, the higher the peak-to-average power ratio, the lower the energy and/or power efficiency may be. Low energy efficiency can be crucial for communication devices 200, in particular cell edge user equipments or low end user equipments, e.g., machine type user equipments. Therefore, sophisticated approaches are desired for an adjustment of the peak-to-average power ratio.

Embodiments of the invention exploit the flexibility of multi-carrier modulation schemes, in particular of filter-bank multi-carrier modulation, with respect to the frame structure. Thus, a flexible adjustment of the peak-to-average power ratio according to the specifications and actual transmission needs of the communication devices 200 is enabled.

Embodiments of the invention are analogously applied to downlink transmission or to direct device-to-device (D2D) transmission. These applications may e.g. be envisaged if energy efficiency is of importance in such kinds of transmissions.

For communication devices 200 located at a cell edge or low-end communication devices 200, the peak-to-average power ratio can be an important parameter and its reduction can have a high priority. Therefore, it can be desirable to provide a dedicated transmission scheme for such kinds of communication devices 200 in order to reduce the peak-to-average power ratio.

However, reducing the peak-to-average power ratio may result in a reduction of spectral efficiency and may increase the complexity of transceivers within the communication devices 200. For communication devices 200 located in a cell center or high-end communication devices 200 or communication devices 200 with plugged in electricity, the priority of energy efficiency can be lower compared to cell edge communication devices 200 or low-end communication devices 200. Thus, such communication devices 200 can afford a higher peak-to-average power ratio and can put a higher priority on other aspects like spectral efficiency and complexity. Therefore, an uplink transmission scheme capable to dynamically adjust the peak-to-average power ratio according to the actual transmission specifications is desirable so as to optimize the trade-off between energy efficiency, spectral efficiency and complexity. For example, for communication devices 200 located at the cell edge and with a limited power budget, the peak-to-average power ratio can be adjusted to a low level so that the effective transmit power can be increased or that the consumed power can be reduced.

Similar challenges can occur in downlink or direct device-to-device (D2D) transmissions. One example for downlink transmission is that communication signals having a low peak-to-average power ratio, if synthesized and amplified in a dedicated manner e.g. using a separate high power amplifier (HPA), can greatly improve the transmitter power efficiency and meanwhile, help the cell edge communication devices 200 or low-end communication devices 200 to have a higher effective received communication signal power, since the dynamic range of radio frequency (RF) receivers, in particular of low noise amplifiers (LNAs) and analog-to-digital-converters (ADCs), can be exploited more efficiently.

Another example refers to the case where a low-cost relay station or a small base station shares spectrum with a macro base station. The relay station or small base station may transmit only in a frequency sub-band of the entire shared spectrum and may adjust the peak-to-average power ratio in this frequency sub-band according to the linearity of its radio frequency transmitter. Similarly, in the direct device-to-device (D2D) case, the transmitter may transmit a multi-carrier communication signal only in a frequency sub-band of the entire downlink and/or uplink spectrum. It may be able to adjust the peak-to-average power ratio of its multi-carrier communication signal in this frequency sub-band according to its energy efficiency specification.

Figure 8:
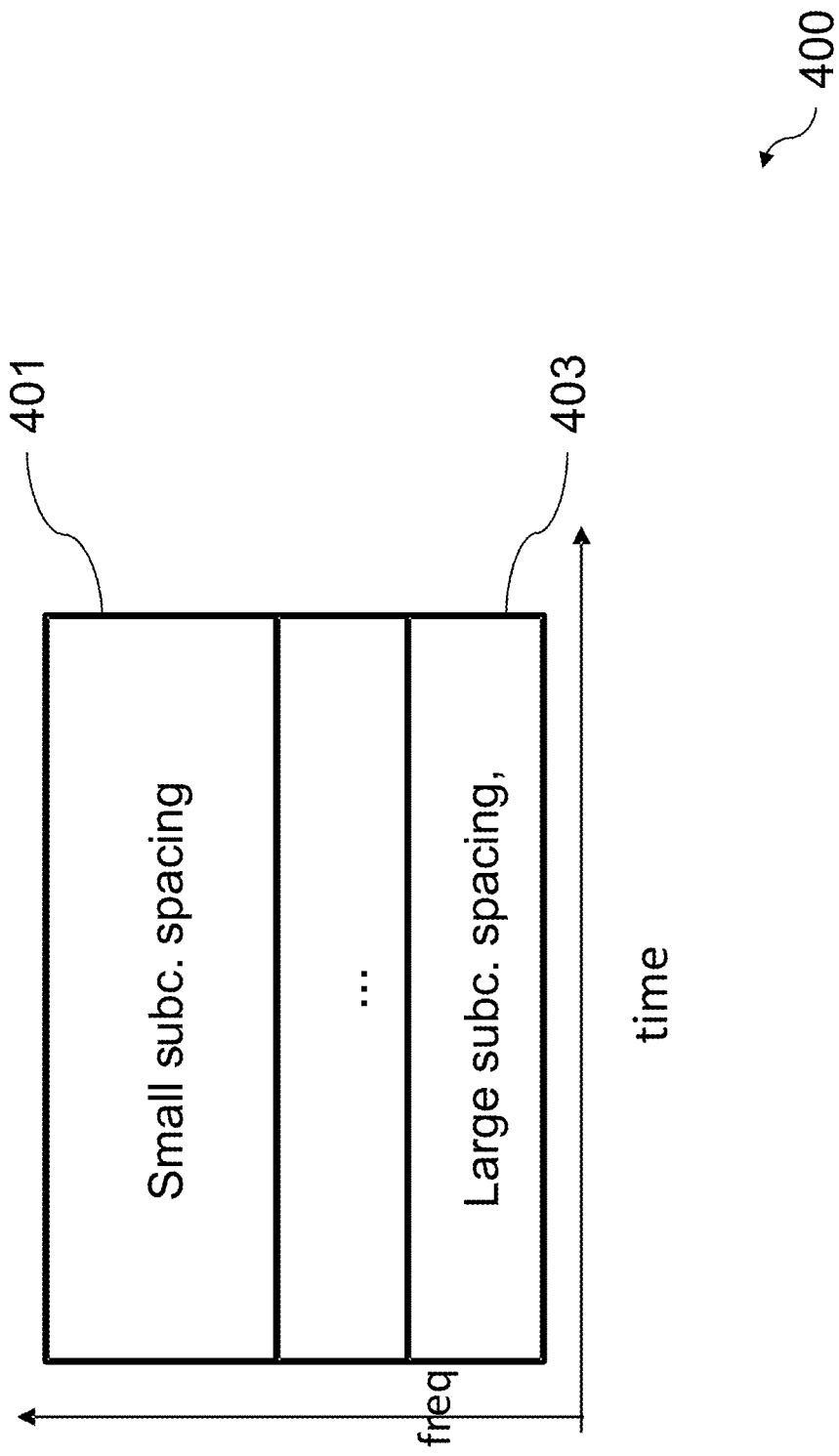
FIG. 8 shows a diagram of a frame structure for communications of a plurality of communication devices within a communication network according to an embodiment.

FIG. 8 shows a diagram of a frame structure 400 for communications of a plurality of communication devices within a communication network according to an embodiment. The frame structure 400 is illustrated in terms of time versus frequency. The frame structure 400 comprises a first resource block 401 having a small sub-carrier frequency spacing, and a second resource block 403 having a large sub-carrier frequency spacing. A resource block can be allocated to each communication device according to specifications on energy efficiency and data rate. The diagram illustrates the principle of an uplink frame structure allowing for different sub-carrier frequency spacings in different resource blocks.

Embodiments of the invention apply a transmission scheme based on filter-bank multi-carrier modulation, and exploit the flexibility of multi-carrier modulation, in particular of filter-bank multi-carrier modulation, with respect to the frame structure 400. Since the frame structure 400 can allow for adjusting the sub-carrier frequency spacing in different resource blocks, the peak-to-average power ratio of the multi-carrier communication signals in each resource block can be adjusted flexibly. Thus, an adjustment of the energy efficiency of communication devices 200 can be performed according to actual specifications for transmission.

For a given transmission bandwidth, e.g., of a user equipment, a base station or a relay station, the larger the sub-carrier frequency spacing, the smaller the number of sub-carriers may be in a transmitted multi-carrier communication signal. Here, a localized allocation of sub-carriers can be assumed, i.e. only contiguous sub-carriers may be allocated. A smaller number of sub-carriers can lead to a reduced peak-to-average power ratio. Based on the above observations, it is possible to achieve an adjustment of the relevant peak-to-average power ratio by adjusting the sub-carrier frequency spacing e.g. of each communication device 200. This can be an effective and flexible way to adjust the peak-to-average power ratio, which can allow for a low implementation complexity.

The adjustment of the sub-carrier frequency spacing and thus the adjustment of the relevant peak-to-average power ratio can be realized by the following approaches.

Firstly, a definition of a flexible uplink and/or downlink frame structure 400 can be provided which comprises uplink (UL) and/or downlink (DL) resource blocks and/or transmission time slots with different bandwidths and sub-carrier frequency spacings for communication devices 200 having different energy efficiency specifications. The numbers of resource blocks with different sub-carrier frequency spacing can be adapted according to numbers of communication devices 200 having different energy efficiency specifications. As an option, resource blocks with the same sub-carrier frequency spacing can be arranged such that they are neighboring each other.

Secondly, a configuration of the uplink and/or downlink transmission scheme to dedicated users, e.g. communication devices 200, can be performed. The transmission scheme can be defined to be compatible to the above-defined frame structure 400. According to the transmission scheme, each communication device 200 can be allocated to a certain resource block and/or transmission time slot. This can be performed based on a power control mechanism, e.g. an open-loop power control mechanism, it is adopting, e.g. for communications between a base station and a user equipment, its device category regarding typical energy consumption, and its data rate specifications. The power control mechanism and the device category regarding typical energy consumption can determine the specification on energy efficiency.

Embodiments of the invention allow the uplink and/or downlink transmissions to be adapted according to energy efficiency specifications of each individual communication device 200 and thus allow an extension of battery life time of the communication devices 200.

Figure 9:
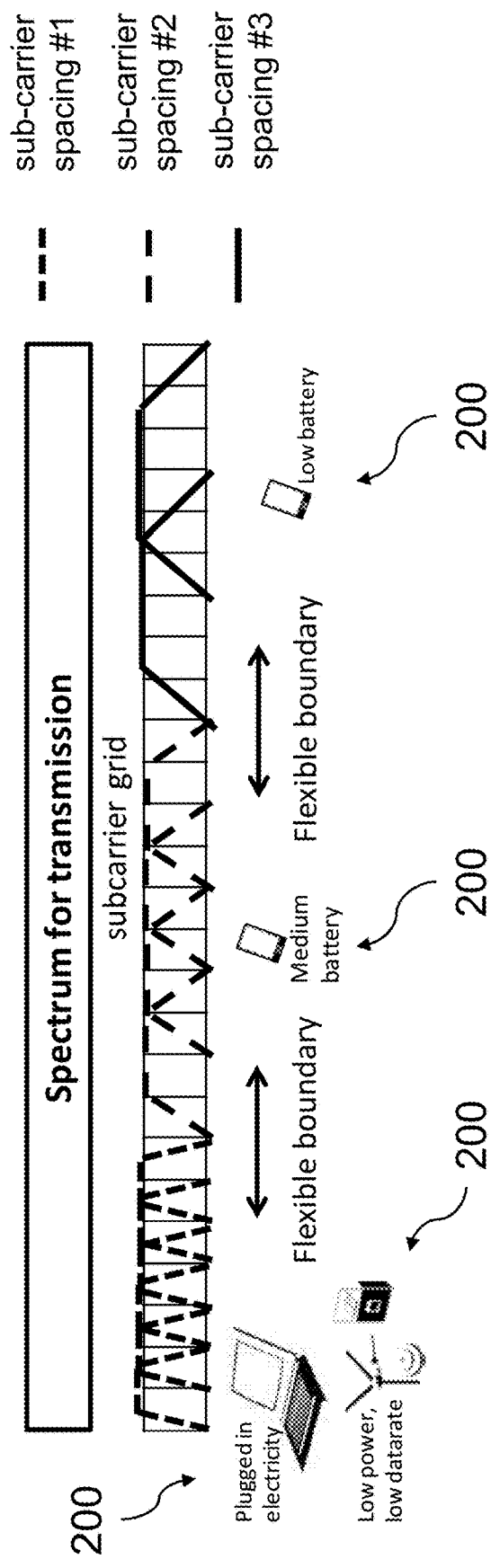
FIG. 9 shows a diagram of a predetermined sub-carrier frequency grid associated with a frame structure according to an embodiment.

FIG. 9 shows a diagram of a predetermined sub-carrier frequency grid associated with a frame structure 400 according to an embodiment. The diagram illustrates different sub-carrier frequency spacings of different communication devices 200, e.g. low battery communication devices 200, medium battery communication devices 200, low power and low data rate communication devices 200, and communication devices 200 having plugged in electricity. The diagram can relate to a predetermined sub-carrier frequency grid for an uplink frame structure 400 having different sub-carrier frequency spacings in different resource blocks.

Embodiments of the invention utilize an adaptable frame structure 400 and an adaptive scheduling scheme to realize a flexible and dynamic adjustment of the transmission bandwidth and the sub-carrier frequency spacing and thus of the peak-to-average power ratio of transmitted multi-carrier communication signals.

The frame structure 400 can be realized as follows. Firstly, a sub-carrier frequency grid for uplink and/or downlink transmission is predefined. This sub-carrier frequency grid can determine a minimum sub-carrier frequency spacing allowed in the uplink and/or downlink transmission. This predetermined sub-carrier frequency grid is illustrated in FIG. 9.

Based on the sub-carrier frequency grid, the uplink and/or downlink resource can be divided into a number of resource blocks, which can use different sub-carrier frequency spacings. The sub-carrier frequency spacing within each resource block can be an integer multiple of the minimum sub-carrier frequency spacing determined by the sub-carrier frequency grid.

The number of resource blocks with the same sub-carrier frequency spacing can be adapted according to the numbers of communication devices 200 having different energy efficiency specifications, e.g. related to downlink and/or uplink power control, device category regarding energy consumption, or a channel quality indicator (CQI), and their data rate specifications.

Figure 10:
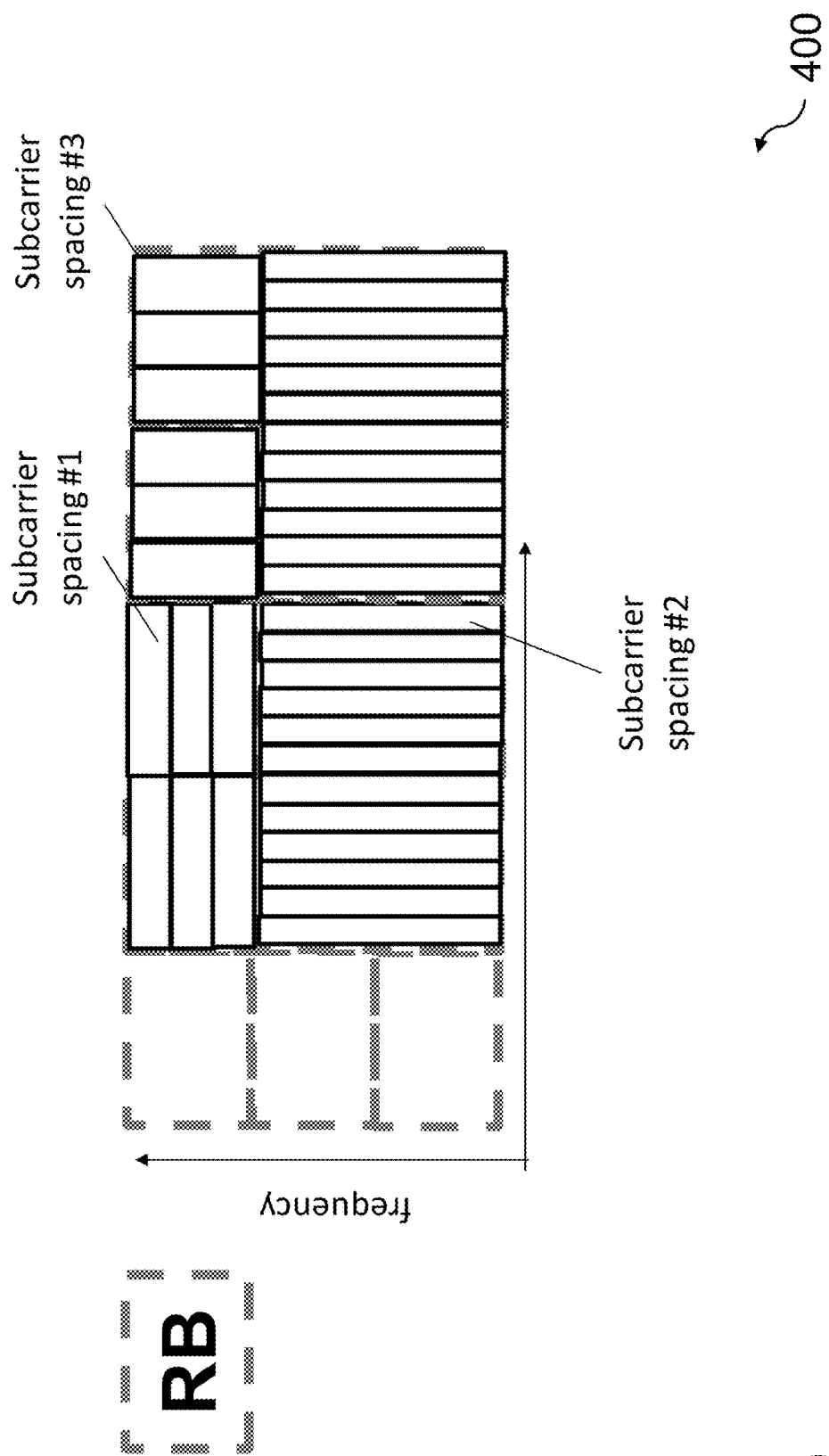
FIG. 10 shows a diagram of a frame structure for communications of a plurality of communication devices within a communication network according to an embodiment.

FIG. 10 shows a diagram of a frame structure 400 for communications of a plurality of communication devices within a communication network according to an embodiment. The frame structure 400 is illustrated in terms of time versus frequency. The frame structure 400 comprises a plurality of resource blocks (RBs). The plurality of resource blocks can have different sub-carrier frequency spacings, e.g. sub-carrier frequency spacing #1, sub-carrier frequency spacing #2, and sub-carrier frequency spacing #3. The diagram illustrates a time and frequency resource map in two dimensions (2D) for uplink and/or downlink transmissions.

A resource block (RB) can be defined as time-frequency resource that is allocated to a communication device. A resource block can indicate a number of minimum sub-carrier frequency spacings in frequency domain, e.g. being determined by a predetermined sub-carrier frequency grid, and duration in time. Actual transmitted multi-carrier communication signals within resource blocks can have different sub-carrier frequency spacings that can be integer multiples of the minimum sub-carrier frequency spacing.

Different definitions for a resource block may exist. A resource block may e.g. be regarded as a time-frequency unit, wherein the term unit may indicate that its size remains the same everywhere within the frame structure. In this context, a resource block refers to a time-frequency resource that is allocated to a communication device. The resource of an entire frame structure can be allocated based on a certain granularity, e.g. a smallest unit that comprises a certain number of minimum sub-carrier frequency spacings and certain duration in time.

If the resource blocks or the sub-frames are self-explanatory, e.g. if reference signals are inserted, a communication device 200 can detect the signal, even if it is not synchronized. This can enable an asynchronous transmission within a communication system 300.

Furthermore, one modulated communication symbol, e.g. a BPSK symbol, a QPSK symbol, or a 16-QAM symbol, can occupy one resource element having a unit sub-carrier frequency spacing and symbol duration.

In a filter-bank multi-carrier (FBMC) communication system, which can be critically sampled, the symbol sampling rate can equal the sub-carrier frequency spacing. This means that the larger the sub-carrier frequency spacing is chosen, the smaller the symbol duration is. Thus, the number of transmitted communication symbols within each resource block can actually be the same, independently of the sub-carrier frequency spacing. A particular case is that the sub-carrier frequency spacing equals the allocated transmission bandwidth, which can convert to a single carrier transmission for this resource block.

Figure 11:
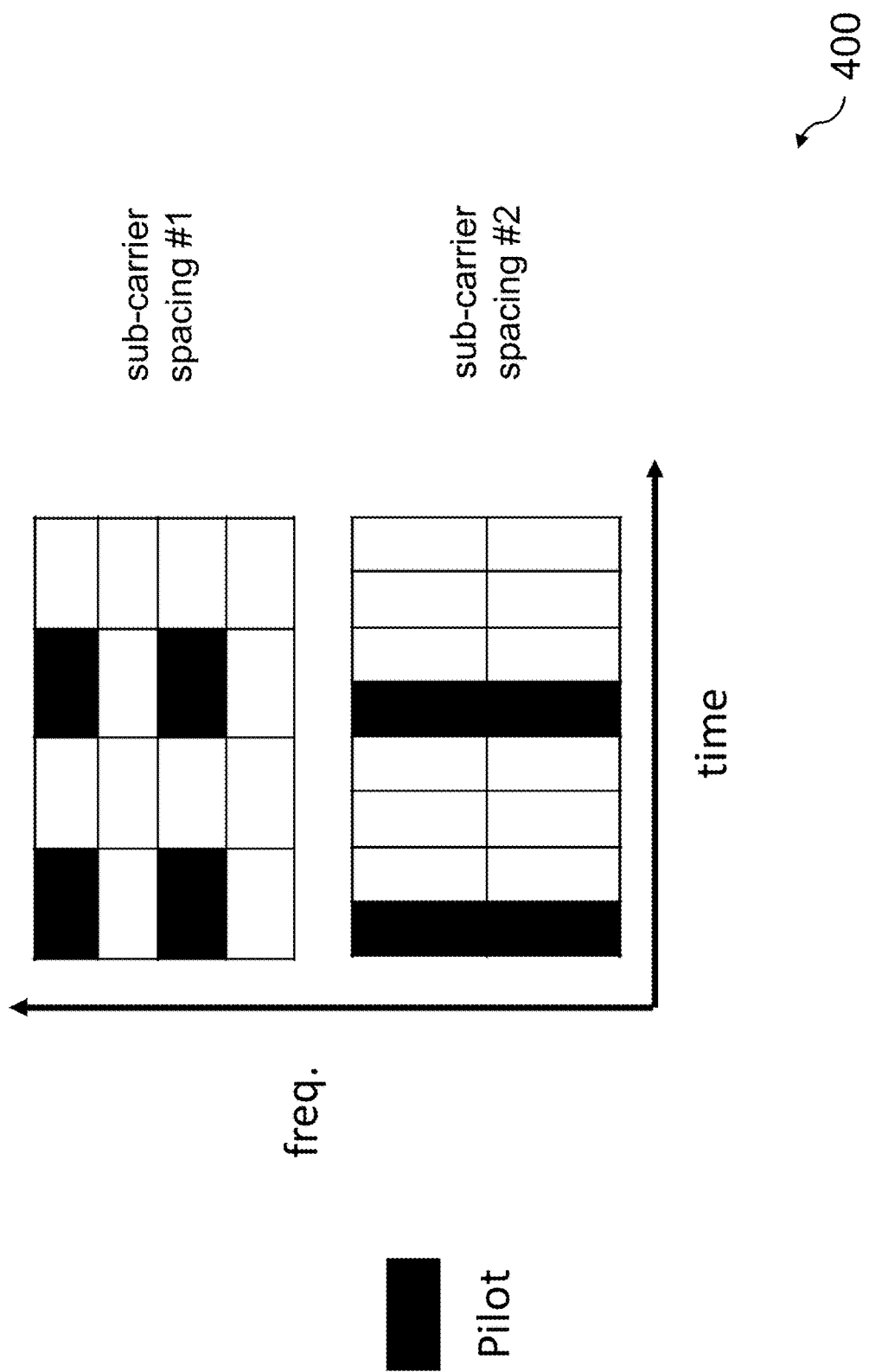
FIG. 11 shows a diagram of a frame structure for communications of a plurality of communication devices within a communication network according to an embodiment.

FIG. 11 shows a diagram of a frame structure 400 for communications of a plurality of communication devices within a communication network according to an embodiment. The frame structure 400 comprises a plurality of resource blocks, e.g. resource block #1, and resource block #2. A plurality of pilot symbols is arranged within the frame structure 400. The diagram illustrates uplink pilot patterns for different resource blocks having different sub-carrier frequency spacings.

In order to achieve equal qualities of channel estimation, and/or phase tracing in different resource blocks, a pilot symbol overhead of different resource blocks may be proportional to the transmission bandwidth. This can be achieved by adapting the pilot symbol, e.g. reference symbol, allocation to keep the pilot symbol overhead constant for each resource block, independently of the sub-carrier frequency spacing. As described, the number of transmitted communication symbols within each resource block can actually be the same, independently of the sub-carrier frequency spacing. Therefore, for a constant pilot symbol overhead, the number of pilot symbols within each resource block may also be the same. Within each resource block, the pilot symbols can be distributed evenly in frequency and/or time, as illustrated in the diagram.

In the case of uplink transmission, the frame structure 400 having different resource blocks can be indicated via specific signaling in the downlink. Such signaling can indicate a start and an ending of each resource block, e.g. both in time and frequency, wherein the transmission bandwidth of each resource block can implicitly be indicated by the start and ending in frequency, and the corresponding sub-carrier frequency spacing. In an embodiment, the start of the resource block in frequency relates to the lower transmission frequency, and the ending of the resource block in frequency relates to the upper transmission frequency.

In the following, a scheme for allocation of resource blocks to communication devices 200 is described.

An adaptation scheme can be used for the allocation of a resource block to each communication device 200, so that the used sub-carrier frequency spacing and thus the peak-to-average power ratio can match the energy efficiency specification of a communication device 200. This adaptation can be based on a specific signaling using an energy efficiency indicator, e.g. an Energy Efficiency Requirement Indicator (EERI), or can be deduced from a category of the communication device 200 e.g. by the network entity 100 or the communication device 200.

For energy efficiency based adaptation, a user-specific signaling field for the adaptation of energy efficiency can be defined as Energy Efficiency Requirement Indicator (EERI). This signaling field can be used to indicate the desired energy efficiency for each communication device 200. As an example, incrementing an energy efficiency indicator value can mean reducing a demand for energy efficiency. The following table provides two examples of values and meanings of an energy efficiency indicator.

TABLE 1

| Value | 1 | 4 |
|---|---|---|
| Desired energy efficiency | High | Low (No concern about energy efficiency) |
| Exemplary communication devices | Sensors, communication device with little remaining battery energy, etc. | Communication devices with power supply, access points in cars, etc. |

For some communication devices 200, e.g., sensors, the energy efficiency indicator may be fixed and predefined and can therefore be known by the network entity 100, e.g., base station. For some other communication devices 200, the energy efficiency indicator can vary depending on different factors e.g. a battery status.

As will be described in the following, the energy efficiency indicator can be taken into account in the resource block allocation and/or assignment of the sub-carrier frequency spacing. In addition to the energy efficiency indicator, an open loop power control based on a receiving power indicator, e.g., a reference signal receiving power (RSRP) indicator, can also be taken into account, which can be relevant for a transmission power of a communication device 200.

For example, a bad receiving power indicator can mean that a wireless communication channel between the network entity 100, e.g. a base station or a relay station, and the communication device 200, or between two communication devices 200 in direct device-to-device (D2D) communication can have a high path loss and the communication device 200 may have to use a high transmission power for the corresponding transmission.

One typical example is that an energy sensitive communication device 200, e.g. indicated by the energy efficiency indicator, with a bad receiving power indicator caused by a high path loss desires a low peak-to-average power ratio in order to enhance an effective transmission power. For such a communication device 200, the network entity 100 can allocate the resource block with the largest possible sub-carrier frequency spacing that supports the desired data rate of this communication device 200.

Based on the energy efficiency indicator, e.g. the Energy Efficiency Requirement Indicator (EERI), and the receiving power indicator, e.g. the reference signal receiving power (RSRP) indicator, dynamic schemes can be utilized for the allocation of the resource blocks and/or sub-carrier frequency spacings. The schemes can differ in the cases of cellular uplink/downlink transmission, direct device-to-device (D2D) communications, and transmissions of relay stations in a downlink spectrum.

Figure 12:
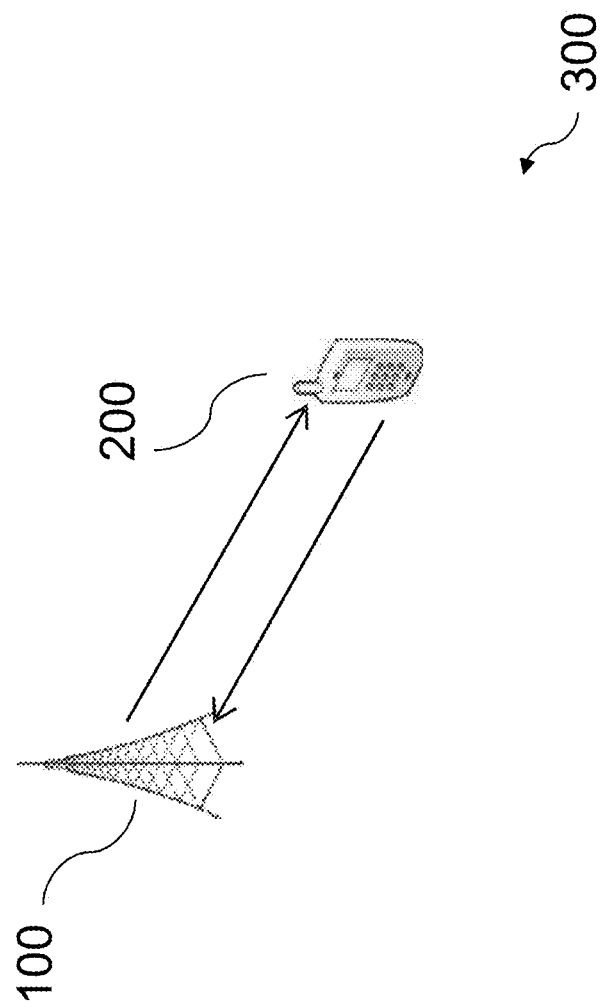
FIG. 12 shows a diagram of a communication system comprising a network entity and a communication device according to an embodiment.

FIG. 12 shows a diagram of a communication system 300 comprising a network entity 100 and a communication device 200 according to an embodiment. The diagram illustrates a possible implementation of an open loop power and energy efficiency based control as well as a resource block allocation. The network entity 100 can be a base station (BS).

An allocation scheme for cellular uplink and/or downlink communications can be of particular interest. Allocation schemes for direct device-to-device (D2D) communications and transmissions of relay stations in a downlink spectrum are natural extensions. For cellular uplink and/or downlink communications, the following procedure can be used for the adaptation of the peak-to-average power ratio.

In a first step, each communication device 200 can estimate a downlink path loss and a receiving power indicator e.g. based on downlink pilot symbols.

In a second step, for uplink communications, each communication device 200 can send an energy efficiency indicator, e.g. if not known at the network entity 100, and/or a receiving power indicator back to the network entity 100 in an uplink control channel. For downlink communications, only a receiving power indicator may be sent.

In a third step, the network entity 100 can derive the energy efficiency specification of each communication device 200 from the energy efficiency indicator and/or the receiving power indicator. Based on the specifications of each communication device 200 with regard to energy efficiency and data rate, the network entity 100 can determine a number of sub-carriers and/or a sub-carrier frequency spacing for each communication device 200.

According to the number of sub-carriers and/or the sub-carrier frequency spacing of all communication devices 200, the network entity 100 can adapt a structure of resource blocks of an uplink frame structure for uplink communications. Afterwards, the network entity 100 can allocate a resource block, thereby e.g. determining the sub-carrier frequency spacing, and sub-carriers to each communication device 200.

For downlink communications, the network entity 100 can adapt the structure of transmission time slots of a downlink frame structure. Each transmission time slot may comprise only one sub-carrier frequency spacing. Different transmission time slots of different lengths can have different sub-carrier frequency spacings. An example is that for all edge communication devices 200 having high energy efficiency specifications, the network entity 100 allocates a transmission time slot having a large sub-carrier frequency spacing, i.e. a low number of sub-carriers and thus a low peak-to-average power ratio. Afterwards, the network entity 100 can allocate a transmission time slot, thereby e.g. determining the sub-carrier frequency spacing, to each communication device 200.

In a fourth step, the communication device 200 can perform an open loop power control based on the allocated resource block and/or sub-carrier frequency spacing by adjusting a back-off of a transmission power for uplink communications, and an automatic gain control based on the allocated transmission time slot and/or sub-carrier frequency spacing by adjusting a reception gain for downlink communications.

In a fifth step, a periodical repetition of the first step to the fourth step can be performed. In the diagram, an exemplary implementation of the described scheme based on open loop power control and energy efficiency indicator based control is illustrated.

Figure 13:
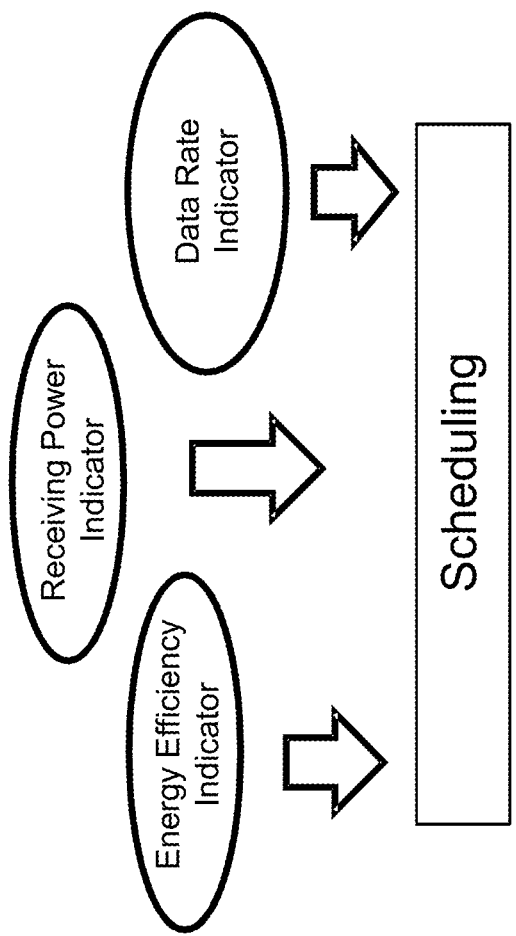
FIG. 13 shows a diagram of a scheduling approach based on an energy efficiency indicator, a receiving power indicator, and a data rate indicator according to an embodiment.

FIG. 13 shows a diagram of a scheduling approach based on an energy efficiency indicator, a receiving power indicator, and a data rate indicator according to an embodiment. The energy efficiency indicator, the receiving power indicator, and the data rate indicator can be relevant factors influencing the scheduling and/or allocation performed by the network entity 100 in the third step.

Firstly, the network entity 100 can determine the number of sub-carriers according to the receiving power indicator and/or the energy efficiency indicator, which can be an important factor determining the peak-to-average power ratio of the multi-carrier communication signal.

Afterwards, the network entity 100 can determine the sub-carrier frequency spacing, e.g. the resource block and/or transmission time slot for the communication device 200 according to the data rate specification of the concerned communication device 200 and/or a targeted signal-to-interference-plus-noise ratio (SINR) of the concerned communication device 200. The reason can be that the sub-carrier frequency spacing multiplied by the number of sub-carriers can equal the transmission bandwidth used by the concerned communication device 200.

Based on the overall number of sub-carriers and/or the sub-carrier frequency spacing of a communication system 300, the network entity 100 can adapt the resource block structure of an uplink frame structure, e.g. a number of different resource blocks having different sub-carrier frequency spacings, the values of the sub-carrier frequency spacings, and the transmission bandwidth of each resource block for uplink communications.

Based on the overall number of sub-carriers and/or the sub-carrier frequency spacing of the communication system 300, the network entity 100 can adapt the structure of the transmission time slots, e.g. the number of different transmission time slots having different sub-carrier frequency spacings, the values of the sub-carrier frequency spacings, and the duration of each transmission time slot for downlink communications.

The uplink and/or downlink partitioning can be conducted by the network entity 100 and can be broadcasted to all connected communication devices 200. Finally, in the third step, the network entity 100 can indicate the frequency sub-band and/or transmission time slot allocation and granting via specific signaling. Such signaling may e.g. utilize a sub-band/time slot indicator and/or a sub-carrier frequency spacing indicator in a downlink broadcast/control channel.

For direct device-to-device (D2D) communications, the above scheme can be reused with just the following modification in the first step. In the first step, a communication device participating in the direct device-to-device communications estimates the path loss and the receiving power indicator of the communication link and communicates it to its partnering device-to-device communication device. Such estimation can be performed e.g. based on a transmission of training signals between such communication devices.

For transmissions of a relay station in a downlink spectrum, the above scheme can be simplified as follows in order to adjust the peak-to-average power ratio of the transmitted multi-carrier communication signal of the relay station. In the first step, each communication device 200 estimates a downlink path loss and a receiving power indicator based on downlink common reference or pilot signals. In the second step, the energy efficiency indicator of the relay station can be predetermined and/or known by itself. Therefore, based on the path loss to the served communication device and its energy efficiency indicator, it can determine the sub-carrier frequency spacing and the used number of sub-carriers in the frequency resource allocated to it so that the peak-to-average power ratio can match its energy efficiency specification.

The frame structure 400, e.g. for uplink communications, can be standardized including the transmission bandwidths of the resource blocks, the resource map, and the resource blocks having different sub-carrier frequency spacings. Furthermore, the signaling fields for indicating the structure of the resource blocks as well as the resource block allocation and/or granting via a downlink broadcast/control channel can be standardized.

Embodiments of the invention relate to a filter-bank multi-carrier (FBMC) signal transmission frame structure 400 based on a common frequency sub-carrier grid and/or a resource block (RB) grid, wherein the transmission resource is divided into variable resource blocks and/or transmission time slots with different sub-carrier frequency spacings, wherein the transmission bandwidth of each resource block and/or a duration of each transmission time slot are adapted according to a numbers of communication devices 200 with different energy efficiency specifications and data rate specifications, and/or wherein an equal pilot symbol overhead in each resource block with different sub-carrier frequency spacings is utilized.

Embodiments of the invention relate to a method for allocating resource blocks and/or transmission time slots to communication devices 200 to dynamically adapt the energy efficiency of transmission in uplink or received signal quality in downlink to actual specifications of the communication devices 200, comprising the steps of a path loss measurement, an energy efficiency indicator and/or receiving power indicator report, a determination of a number of sub-carriers and a sub-carrier frequency spacing for each communication device 200 based on its energy efficiency specification and/or data rate specification, an adaptation of the frame structure 400 comprising the number of different resource blocks and/or different transmission time slots with different sub-carrier frequency spacings, an adaptation of the values of the sub-carrier frequency spacings, an adaptation of the transmission bandwidth of each resource block and/or duration of each transmission time slot, a resource block granting for access, and a power control.

The invention claimed is:
1. A network entity for managing communications of a plurality of communication devices within a communication network, a communication device of the plurality of communication devices being configured to transmit a multi-carrier communication signal comprising a plurality of sub-carriers, and to transmit an energy efficiency indicator indicating an energy efficiency specification of the communication device, the network entity comprising:

a communication interface configured to receive the energy efficiency indicator over the communication network and to receive a data rate indicator over the communication network from the communication device, wherein the data rate indicator indicates a data rate specification of the communication device; and a processor configured to determine a sub-carrier frequency spacing of the plurality of sub-carriers upon the basis of the energy efficiency indicator and the data rate indicator, and to generate a resource block indicator associated with the communication device, wherein the resource block indicator indicates the sub-carrier frequency spacing;

wherein the communication interface is further configured to transmit the resource block indicator over the communication network to the communication device.

2. The network entity of claim 1, wherein the processor is further configured to determine a number of sub-carriers of the multi-carrier communication signal upon the basis of the energy efficiency indicator, and wherein the resource block indicator further indicates the number of sub-carriers of the multi-carrier communication signal.

3. The network entity of claim 1, wherein the processor is further configured to determine a lower transmission frequency of the multi-carrier communication signal, an upper transmission frequency of the multi-carrier communication signal, or a transmission time slot of the multi-carrier communication signal, and wherein the resource block indicator further indicates the lower transmission frequency, the upper transmission frequency, or the transmission time slot of the multi-carrier communication signal.

4. The network entity of claim 1, wherein the sub-carrier frequency spacing of the plurality of sub-carriers is an integer multiple of a predetermined sub-carrier frequency spacing associated with the communication network.

5. The network entity of claim 1, wherein the communication interface is further configured to transmit a reference signal over the communication network to the communication device, and to receive a receiving power indicator over the communication network from the communication device, wherein the receiving power indicator indicates a path loss of the reference signal, and wherein the processor is further configured to determine the sub-carrier frequency spacing upon the basis of the receiving power indicator.

6. The network entity of claim 1, wherein the processor is configured to determine the sub-carrier frequency spacing of the plurality of sub-carriers upon the basis of a number of communication devices within the plurality of communication devices.

7. A method for managing communications of a plurality of communication devices within a communication network, a communication device of the plurality of communication devices being configured to transmit a multi-carrier communication signal comprising a plurality of sub-carriers, and to transmit an energy efficiency indicator indicating an energy efficiency specification of the communication device, the method comprising:

receiving the energy efficiency indicator over the communication network;

receiving a data rate indicator over the communication network from the communication device, wherein the data rate indicator indicates a data rate specification of the communication device;

determining a sub-carrier frequency spacing of the plurality of sub-carriers upon the basis of the energy efficiency indicator and the data rate indicator;

generating a resource block indicator associated with the communication device, wherein the resource block indicator indicates the sub-carrier frequency spacing; and transmitting the resource block indicator over the communication network to the communication device.

8. A non-transitory computer readable medium having stored thereon computer-executable instructions that when executed by a processor cause the processor to perform operations for managing communications of a plurality of communication devices within a communication network, a communication device of the plurality of communication devices being configured to transmit a multi-carrier communication signal comprising a plurality of sub-carriers, and to transmit an energy efficiency indicator indicating an energy efficiency specification of the communication device, the operations comprising:

receiving the energy efficiency indicator over the communication network;

receiving a data rate indicator over the communication network from the communication device, wherein the data rate indicator indicates a data rate specification of the communication device;

determining a sub-carrier frequency spacing of the plurality of sub-carriers upon the basis of the energy efficiency indicator and the data rate indicator;

generating a resource block indicator associated with the communication device, wherein the resource block indicator indicates the sub-carrier frequency spacing; and transmitting the resource block indicator over the communication network to the communication device.

\* \* \* \* \*